(12) United States Patent
Hadka et al.

(10) Patent No.: US 8,856,054 B2
(45) Date of Patent: Oct. 7, 2014

(54) EVOLUTIONARY COMPUTING BASED OPTIMIZATION

(75) Inventors: David Hadka, State College, PA (US); Patrick Reed, State College, PA (US)

(73) Assignee: The Penn State Research Foundation Intellectual Property Offie, The Pennsylvania State University, University Park, PA (US)

( * ) Notice: Subject to any disclaimer, the term of this patent is extended or adjusted under 35 U.S.C. 154(b) by 201 days.

(21) Appl. No.: 13/356,391

(22) Filed: Jan. 23, 2012

(65) Prior Publication Data
US 2012/0197830 A1    Aug. 2, 2012

Related U.S. Application Data

(60) Provisional application No. 61/437,846, filed on Jan. 31, 2011.

(51) Int. Cl.
*G06N 3/12* (2006.01)

(52) U.S. Cl.
CPC ........................... *G06N 3/126* (2013.01)
USPC ................................................ 706/13

(58) Field of Classification Search
None
See application file for complete search history.

(56) References Cited

U.S. PATENT DOCUMENTS

2007/0094167 A1* 4/2007 Sendhoff et al. ............... 706/13
2010/0292928 A1* 11/2010 Ferringer et al. .............. 706/13

OTHER PUBLICATIONS

Hadka, D. et al. Borg. An Auto-Adaptive Many-Objective Evolutionary Computing Framework. Evolutionary Computation 2009 [retrieved on Sep. 24, 2013]. [retrieved from coe.psu.edu].*
Kollat, J et al. Comparing State-of-the-Art Evolutionary Multi-Objective Algorithms for Long-Term Groundwater Monitoring Design. Advances in Water Resources vol. 29 No. 6 pp. 792-807, Jun. 2006 [retrieved on Sep. 25, 2013]. [retrieved from sciencedirect.com].*
Miller, B. et al. Genetic Alogirthms, Tounament Selection, and the Effects of Noise. Complex Systems vol. 9 pp. 193-212 1995 [retrieved on Sep. 26, 2013]. [retrieved from CiteSeerx.ist.psu.edu].*
Vrugt, J et al. Improved Evolutionary Optimization from Genetically Adaptive Multimethod Search. Proceedings of the National Academy of Sciences of the United States of America vol. 104 No. 3 pp. 708-711 Jan. 17, 2007 [retrieved on Sep. 26, 2013]. [retrieved from pnas.org].*
Kollat, J.B. et al., "Comparing state-of-the-art evolutionary multi-objective algorithms for long-term groundwater monitoring design", Advances in Water Resources 29 (2006), pp. 792-807.
Vrugt, Jasper A. et al., "Improved evolutionary optimization from genetically adaptive multimethod search", www.pnas.org/cgi/doi/10.1073/pnas.0610471104, pp. 708-711, Jan. 16, 2007, vol. 104, No. 3.
Tang, Y. et al., "How effective and efficient are multiobjective evolutionary algorithms at hydrologic model calibration?", Hydrol. Earth Syst. Sci. 10, 289-307, 2006.
Hadka, David, MOEA Framework, MOEAFramework-1.8/src/org/moeaframework/instrumenter.java, pp. 1-8, 2009.

(Continued)

*Primary Examiner* — Kakali Chaki
*Assistant Examiner* — Eric Nilsson
(74) *Attorney, Agent, or Firm* — Park, Vaughan, Fleming & Dowler LLP; Laxman Sahasrabuddhe

(57) ABSTRACT

Some embodiments for performing evolutionary based optimization feature: a dominance archive, auto-adaptive operators, detection of search stagnation, exploitation of randomized restarts to escape local optima, and/or selection of recombination operators based on their success in generating high quality solutions.

21 Claims, 5 Drawing Sheets

```
Input: The new solution x being added to the archive.
Output: true if x is added to the archive; false otherwise.

foreach solution y in the archive do
    if x ≺_ε y then
        | remove y from the archive;    ←—102
    else if y ≺_ε x then
        | return false;    ←—106
add x to the archive;
return true;    ←—104
```

(56) References Cited

OTHER PUBLICATIONS

Reed, Partick M. "Curriculum Vitae", pp. 1-29, http://water.enqr.psu.edu/reed.home.htm.

Raad, Darian et al., "Robust multi-objective optimization for water distribution system design using a meta-metaheuristic", International Transactions in Operational Research, 2009.

Laumanns, Marco et al., "Combining Convergence and Diversity in Evolutionary Multiobjective Optimization", Evolutionary Computation 10(3): 263-282, 2002.

Kollat, Joshua et al., "Evolutionary Multiobjective Optimization in Water Resources: The Past, Present, and Future", Jan. 10, 2012.

Hadka, David et al., "Borg: An Auto-Adaptive Many-Objective Evolutionary Computing Framework", 2009, Evolutionary Computation Just Accepted MS.

Back, Thomas "Selective Pressure in Evolutionary Algorithms: A Characterization of Selection Mechanisms", pp. 57-62, 1994.

Vrugt, Jasper A. et al., "Self-Adaptive Multimethod Search for Global Optimization in Real-Parameter Spaces", IEEE Transactions on Evolutionary Computation, vol. 13, No. 2, Apr. 2009.

\* cited by examiner

Input: The new solution x being added to the archive.
Output: true if x is added to the archive; false otherwise.

foreach *solution y in the archive* do
    if x $\prec_\epsilon$ y then
        remove y from the archive; ← 102
    else if y $\prec_\epsilon$ x then
        return false;
                ← 106
add x to the archive; ← 104
return true;

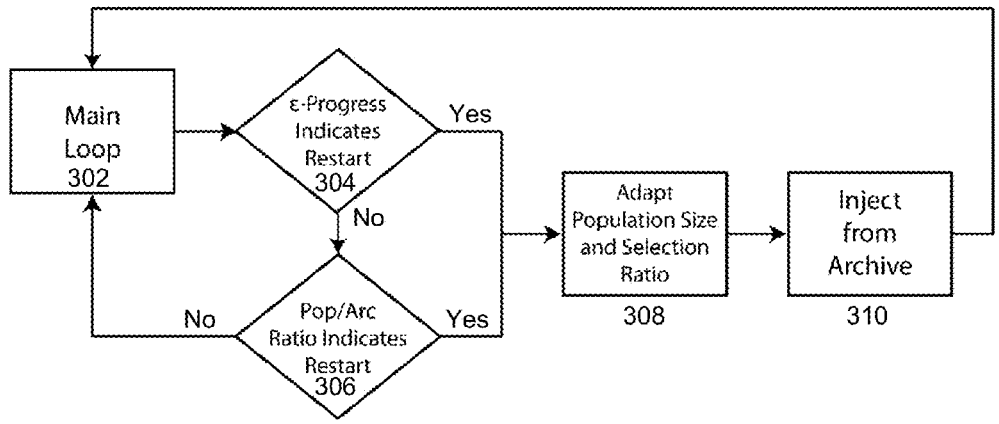

FIG. 3

Input: The current archive, the population-to-archive ratio $\gamma$ and the selection ratio $\tau$
Output: The population after random restart Empty the population;
Fill population with all solutions in the archive; ←——— 402

// Compute the size of the new population
new_size ← $\gamma$ * size(archive); ←——— 404

// Inject mutated archive members into the new population
while size(population) < new_size do ←——— 406
    new_solution ← select randomly one solution from archive;
    Mutate new_solution using uniform mutation applied with probability $1/L$;
    Add new_solution to population;
    Update archive with new_solution;

// Maintain constant selection pressure
Set the tournament size to max(2, floor($\tau$ * new_size)); ←——— 408

FIG. 4

EVOLUTIONARY COMPUTING BASED OPTIMIZATION

RELATED APPLICATION

This application claims priority under 35 U.S.C. §119 to U.S. Provisional Patent Application No. 61/437,846 filed on 31 Jan. 2011, entitled "Borg: An Auto-Adaptive Many-Objective Evolutionary Computing Framework," by the same inventors, which is incorporated by reference herein.

BACKGROUND

1. Technical Field

The present disclosure relates to methods and apparatuses for optimization. More specifically, the present disclosure relates to methods and apparatuses for evolutionary computing based optimization.

2. Related Art

Evolutionary computing based optimization techniques (ECBOTs) are based on the processes of natural evolution. In the past twenty years, researchers have successfully applied ECBOTs to a large array of problems from industrial, electrical, computer, civil and environmental engineering; aeronautics; finance; chemistry; medicine; physics and computer science. However, such studies have traditionally concentrated on problems involving two or three objectives.

While multi-objective applications are growing in their success, there exists strong theoretical and experimental evidence suggesting existing approaches (e.g., evolutionary approaches that are capable of tackling two or three objectives) are insufficient for multi-objective problems. Some studies have observed that the proportion of locally non-dominated solutions tends to become large as the number of objectives increases. This tendency is termed dominance resistance. Other studies show theoretically that dominance resistance can cause the convergence rate of ECBOTs to degrade to be no better than random search for problems with ten or more objectives.

Specifically, a study entitled "Effectiveness of scalability improvement attempts on the performance of NSGA-II for many-objective problems," by authors Ishibuchi, H., Tsukamoto, N., Hitotsuyanagi, Y., and Nojima, Y., showed that several state-of-the-art evolutionary approaches fail on problems with as few as four objectives. This study was published on pages 649-656 of the conference proceedings of the Genetic and Evolutionary Computation Conference (GECCO 2008), New York, N.Y., USA.

Further, some studies have observed that the selection mechanism promoting diverse solutions along the entire extent of the tradeoff surface can cause deterioration. Deterioration occurs whenever the solution set discovered by an ECBOT at time i contains one or more solutions dominated by a solution discovered at some earlier point in time j<i. In the extreme, deterioration can cause an ECBOT to diverge away from the Pareto front. Many state-of-the-art ECBOTs in use today are not capable of avoiding deterioration.

Recently, studies have attempted to rectify these issues by improving various components of ECBOTs. One such approach attempts to eliminate dominance resistance by utilizing more stringent dominance relations. These studies tend to focus on the "knee" region of the Pareto front and fail to produce solutions along the entire extent of the tradeoff surface.

SUMMARY

Some embodiments described herein feature methods and apparatuses for performing evolutionary computing based optimization. Specifically, some embodiments include one or more of the following features: an $\epsilon$-dominance archive, auto-adaptive operators, detection of search stagnation, exploitation of randomized restarts to escape local optima, and/or selection of recombination operators based on their success in generating high quality solutions.

Some embodiments described herein determine an archive of solution vectors for an optimization problem. Specifically, a new solution vector for the optimization problem can be determined based on a population of solution vectors and the archive of solution vectors. In response to determining that the new solution vector dominates one or more solution vectors in the archive of solution vectors, the one or more solution vectors can be replaced with the new solution vector in the archive of solution vectors. In response to determining that $\epsilon$-progress has not occurred, the population based on the archive of solution vectors can be recreated. In some embodiments, determining that $\epsilon$-progress has not occurred can involve comparing a current value of a $\epsilon$-progress counter with a previously stored value of the $\epsilon$-progress counter and/or determining that a $\epsilon$-progress timer has expired.

According to one definition, for a given $\epsilon$ value, new solution vector $u=(u_1, u_2, \ldots, u_M)$ results in $\epsilon$-progress if and only if, for all solution vectors $v=(v_1, v_2, \ldots, v_M)$ in the archive of solution vectors, $$\left\lfloor \frac{v}{\varepsilon} \right\rfloor \neq \left\lfloor \frac{u}{\varepsilon} \right\rfloor \text{ and } \left\lfloor \frac{v}{\varepsilon} \right\rfloor$$

does not Pareto dominate $$\left\lfloor \frac{u}{\varepsilon} \right\rfloor.$$

In some embodiments, the new solution vector dominates an existing solution vector in the archive of solution vectors if and only if the new solution vector $\epsilon$-dominates the existing solution vector. According to one definition, for a given $\epsilon>0$ value, a solution vector $u=(u_1, u_2, \ldots, u_M)$ $\epsilon$-dominates another solution vector $v=(v_1, v_2, \ldots, v_M)$ if and only if $\forall\forall i \in \{1, 2, \ldots, M\}, u_i \leq v_i + \epsilon$ and $\exists j \in \{1, 2, \ldots M\}, u_i < v_j + \epsilon$.

In some embodiments, the new solution vector dominates an existing solution vector in the archive of solution vectors if and only if the new solution vector $\epsilon$-box dominates the existing solution vector. According to one definition, for a given $\epsilon>0$ value, solution vector $u=(u_1, u_2, \ldots, u_M)$ $\epsilon$-box dominates solution vector $v=(v_1, v_2, \ldots, v_M)$ if and only if:

$$\left\lfloor \frac{u}{\varepsilon} \right\rfloor < \left\lfloor \frac{v}{\varepsilon} \right\rfloor,$$

or $$\left\lfloor \frac{u}{\varepsilon} \right\rfloor = \left\lfloor \frac{v}{\varepsilon} \right\rfloor \text{ and } \left\| u - \varepsilon \left\lfloor \frac{u}{\varepsilon} \right\rfloor \right\| < \left\| v - \varepsilon \left\lfloor \frac{v}{\varepsilon} \right\rfloor \right\|.$$

In some embodiments, a ratio between a size of the population and a size of the archive of solution vectors can be determined. In response to determining that a difference between the determined ratio and a target ratio is greater than a pre-determined threshold, the population can be recreated based on the archive of solution vectors. In some embodiments, recreating the population can involve: adjusting a size of the population so that a ratio between the size of the population and the size of the archive of solution vectors is substantially equal to a target ratio, and adjusting a tournament size so that a selection pressure of a tournament selection process that is used for recreating the population is substantially equal to a target selection pressure.

In some embodiments, recreating the population based on the archive of solution vectors can include: emptying the population; adding solution vectors from the archive of solution vectors to the population; randomly selecting a solution vector from the archive of solution vectors, and one or more solution vectors from the population; recombining the randomly selected solution vectors to obtain a mutated solution vector; adding the mutated solution vector to the population; and if the mutated solution vector dominates one or more solution vectors in the archive of solution vectors, replacing the one or more solution vectors in the archive of solution vectors by the mutated solution vector.

In some embodiments, determining the new solution vector for the optimization problem can include: selecting a recombination operator from a set of recombination operators based on a set of probability values, wherein each recombination operator corresponding to a probability value; determining the new solution vector using the selected recombination operator; and in response to determining that the new solution vector dominates one or more solution vectors in the archive of solution vectors, increasing the probability value associated with the selected recombination operator.

The set of recombination operators can include one or more of: a simulated binary crossover operator; a differential evolution operator; a parent-centric crossover operator; a unimodal normal distribution operator; a simplex crossover operator; or a uniform mutation operator.

BRIEF DESCRIPTION OF THE FIGURES

FIG. 3 presents a flowchart that illustrates a process for restarting the optimization in accordance with some embodiments described herein.

FIG. 4 illustrates a process for creating a new population during restart in accordance with some embodiments described herein.

DETAILED DESCRIPTION

Figures 1, 2:
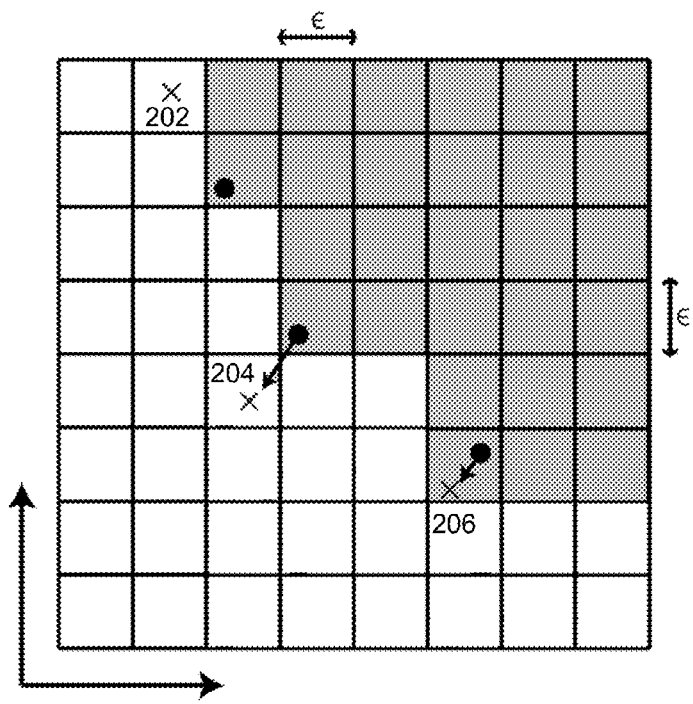
FIG. 1 illustrates a process for updating an $\epsilon$-box dominance archive in accordance with some embodiments described herein.
FIG. 2 illustrates how $\epsilon$-progress can be measured in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

An optimization problem with M objectives can be defined as:

$$\begin{aligned}\min_{x\in\Omega}imize \quad & F(x) = (f_1(x), f_2(x), \ldots, f_M(x)) \\ \text{subject to} \quad & c_i(x) = 0, \forall\, i \in \mathcal{E}, \\ & c_j(x) \leq 0, \forall\, j \in \mathcal{I}.\end{aligned}$$

We call x the decision variables and $\Omega$ the decision space. The decision variables can have real or complex values. Without loss of generality, let $x=(x_1, x_1, \ldots, x_L)$, $x_i \in \Re$, of fixed length L. The sets $\mathcal{E}$ and $\mathcal{I}$ contain the indices for all equality and inequality constraints, respectively. The feasible region is the set of all decision variables in $\Omega$ that satisfy all constraints. The optimization problem can be constrained or unconstrained (i.e., when sets $\mathcal{E}$ and $\mathcal{I}$ are null). Some embodiments described herein can be used for problems with $M \geq 4$ objectives.

Embodiments disclosed herein can be used for a priori optimization or a posteriori optimization. According to one definition, a priori optimization refers to an optimization process in which the weights and/or preferences of the different components of the cost function are known a priori. According to one definition, a posteriori optimization refers to an optimization process in which the weights and/or preferences of the different components of the cost function are not known a priori. When used for a posteriori optimization, some embodiments described herein can generate a set of potential solutions allowing a decision maker to explore the various tradeoffs and identify the preferred solution(s).

The notion of optimality when tradeoffs exist between solutions can be captured by Pareto dominance and the Pareto optimal set. The terms "Pareto dominance," "Pareto optimal set," and "Pareto front" can be defined as follows.

A vector $u=(u_1, u_2, \ldots, u_M)$ Pareto dominates another vector $v=(v_1, v_2, \ldots, v_M)$ if and only if $\forall i \in \{1, 2, \ldots, M\}, u_i \leq v_j$ and $\exists j \in \{1, 2, \ldots M\}, u_j < v_j$. Pareto dominance is denoted by $u \prec v$.

For a given multi-objective problem, the Pareto optimal set is defined by $$\mathcal{P}* = \{x \in \Omega \mid \neg \exists x' \in \Omega, F(x') \prec F(x)\}$$

For a given multi-objective problem with Pareto optimal set $\mathcal{P}*$, the Pareto front is defined by $$\mathcal{PF}* = \{F(x) \mid x \in \mathcal{P}*\}$$

In ECBOTs, the Pareto dominance relation is applied to the objectives. For convenience, we use $x \prec y$ interchangeably with $F(x) \prec F(y)$. Two solutions are non-dominated if neither Pareto dominates the other. Using this terminology, the goal of a posteriori optimization is the enumeration or approximation of the Pareto front.

Some embodiments described herein present an ECBOT that is specifically designed for handling multi-objective (especially when the number of objective is greater than or equal to four), multimodal problems. Specifically, some embodiments described herein include one or more of the following features: (1) an $\epsilon$-box dominance archive for maintaining convergence and diversity throughout search; (2) $\epsilon$-progress, which is a computationally efficient measure of search progression/stagnation; (3) an adaptive population sizing operator based on a use of time continuation to maintain search diversity and to facilitate escape from local optima; (4) multiple recombination operators to enhance search in a wide assortment of problem domains; and (5) a steady-state, elitist model of $\epsilon$-ECBOT, which can be easily extended for use on parallel architectures.

$\epsilon$-Box Dominance

For a given $\epsilon>0$, a vector $u=(u_1, u_2, \ldots, u_M)$ $\epsilon$-dominates another vector $v=(v_1, v_2, \ldots, v_M)$ if and only if $\forall i \in \{1, 2, \ldots, M\}, u_i \leq v_i + \epsilon$ and $\exists j \in \{1, 2, \ldots M\}, u_j < v_j + \epsilon$.

In addition to the theoretical benefits of guaranteed convergence and diversity, $\epsilon$-dominance provides a minimum resolution which effectively bounds the archive size. This is of practical importance to decision makers, who are able to define $\epsilon$ using domain-specific knowledge of their precision goals or computational limits. In practice, it is useful to specify different $\epsilon$ values for each objective; however, without loss of generality, a single $\epsilon$ value is used in the following discussion for the sake of clarity and ease of discourse.

$\epsilon$-box dominance is a variation of $\epsilon$-dominance, and is defined as follows. For a given $\epsilon>0$, a vector $u=(u_1, u_2, \ldots, u_M)$ $\epsilon$-box dominates another vector $v=(v_1, v_2, \ldots, v_M)$ if and only if one of the following is true: (1)

$$\left\lfloor \frac{u}{\varepsilon} \right\rfloor \prec \left\lfloor \frac{v}{\varepsilon} \right\rfloor, \text{ or } (2) \left\lfloor \frac{u}{\varepsilon} \right\rfloor = \left\lfloor \frac{v}{\varepsilon} \right\rfloor \text{ and } \left\| u - \varepsilon \left\lfloor \frac{u}{\varepsilon} \right\rfloor \right\| < \left\| v - \varepsilon \left\lfloor \frac{v}{\varepsilon} \right\rfloor \right\|.$$

$\epsilon$-box dominance is denoted by $u \prec v$. Conceptually, the $\epsilon$-box dominance archive divides the objective space into hyperboxes with side-length $\epsilon$, called $\epsilon$-boxes. The $\epsilon$-box in which a solution vector resides is determined using the $\epsilon$-box index vector. We use the notation $$\left\lfloor \frac{u}{\epsilon} \right\rfloor = \left( \left\lfloor \frac{u_1}{\epsilon} \right\rfloor, \left\lfloor \frac{u_2}{\epsilon} \right\rfloor, \ldots, \left\lfloor \frac{u_M}{\epsilon} \right\rfloor \right)$$

for computing the $\epsilon$-box index vector, where $\lfloor . \rfloor$ is the floor function. Note that $\epsilon$-box dominance is determined using this index vector rather than the object values. Case (2) in the $\epsilon$-box dominance definition shown above covers the situation in which two or more solutions reside in the same $\epsilon$-box. In this situation, the solution nearest the lower-left (minimized) corner of the $\epsilon$-box dominates any other solutions in the same $\epsilon$-box.

FIG. 1 illustrates a process for updating an $\epsilon$-box dominance archive in accordance with some embodiments described herein.

The input to the process is the new solution vector x that is being added to the archive. The process outputs a "true" value if solution vector x is added to the archive; a "false" value otherwise. If vector x $\epsilon$-box dominates one or more vectors in the archive, then the process removes all such vectors (operation 102), and adds vector x to the archive (operation 104). On the other hand, if a vector in the archive $\epsilon$-box dominates x, then the process returns a "false" value without changing the archive (operation 106). In some embodiments, the archive of solution vectors is an enumeration or an approximation of the Pareto front.

The pseudocode shown in FIG. 1 has been presented only for purposes of illustration and description. It is not intended to limit the present invention to the form disclosed. Accordingly, many modifications and variations will be apparent to practitioners skilled in the art. For example, a process for updating an $\epsilon$-dominance archive can be obtained by replacing the $\epsilon$-box dominance operator "$\prec_\epsilon$" with an $\epsilon$-dominance operator in FIG. 1.

$\epsilon$-Progress

While the $\epsilon$-box dominance archive guarantees convergence and diversity, this guarantee is subject to the solutions produced by the ECBOT. ECBOTs tend to fail on multimodal problems due to pre-convergence to local optima causing search to stagnate. Some embodiments described herein use a computationally efficient extension to the $\epsilon$-box dominance archive for measuring search progression called $\epsilon$-progress. The inability of an ECBOT to maintain $\epsilon$-progress indicates search stagnation, which can subsequently trigger routines for reviving search.

$\epsilon$-progress occurs when a solution x passed to the process shown in FIG. 1 is accepted into the archive such that no existing member of the archive existed with the same $\epsilon$-box index vector.

FIG. 2 illustrates how $\epsilon$-progress can be measured in accordance with some embodiments described herein.

In the 2-dimensional example shown in FIG. 2, existing archive members are indicated by a "●," and the $\epsilon$-boxes dominated by these members are shaded. New solutions that are added to the archive are indicated by a "x". Solutions 202 and 204 depict occurrences of $\epsilon$-progress. The new solutions reside in previously unoccupied $\epsilon$-boxes. Solution 206 shows the situation in which the new solution is accepted into the archive, but since it resides in an occupied $\epsilon$-box it does not count towards $\epsilon$-progress because the improvement is below the threshold $\epsilon$.

$\epsilon$-progress supplements the use of $\epsilon$ as the problem resolution by mandating $\epsilon$ as the minimum threshold for improvement. In some embodiments described herein, the process must periodically produce at least one solution whose improvement exceeds this threshold to avoid stagnation. If stagnation is detected, appropriate action can be taken to either revive search or terminate the process.

In some embodiments described herein, the $\epsilon$-box dominance archive increments a counter every time $\epsilon$-progress occurs. This counter can be periodically checked after a user-specified number of evaluations or after a timer expires. If the counter is unchanged from the previous check, then the ECBOT failed to produce significant improvements and a restart mechanism can be triggered.

Restarts

Some embodiments described herein use multiple-epoch runs. Some multiple-epoch runs are characterized by periodically emptying the population, retaining the best solution(s), and repopulating with new randomly-generated solutions.

Between two epochs, the optimization process can perform a restart. Restarts are a mechanism for reviving search after stagnation is detected using $\epsilon$-progress. In some embodiments described herein, a restart can include three functions: (1) the search population size is adapted to remain proportional to the archive size; (2) the selection operator is adapted to maintain a constant selection pressure; and (3) a new population is created by injecting from the archive, i.e., the population is emptied and repopulated with solutions from the archive, with any remaining slots filled by mutated archive solutions.

FIG. 3 presents a flowchart that illustrates a process for restarting the optimization in accordance with some embodiments described herein.

After a certain number of evaluations or after a timer expires, the ECBOT can break out of main loop 302 to check if $\epsilon$-progress indicates a restart should be performed (operation 304) or the population-to-archive ratio indicates a restart should be performed (operation 306). If either of these two checks (i.e., operations 304 or 306) indicates that a restart should be performed, the population size and selection ratio can be adapted (operation 308), and a new population can be created by injecting from the archive (operation 310). Specifically, the population can be resized and filled with solutions selected from the archive and mutated using uniform mutation applied with probability 1/L, where L is the number of decision variables. In addition, the tournament selection size can be adjusted given the new population size to maintain constant selection pressure. Finally, main loop 302 can be resumed.

FIG. 4 illustrates a process for creating a new population during restart in accordance with some embodiments described herein. The pseudocode shown in FIG. 4 has been presented only for purposes of illustration and description. It is not intended to limit the present invention to the form disclosed. Accordingly, many modifications and variations will be apparent to practitioners skilled in the art.

Once the old members in the population have been removed, the population can be filled with solutions in the archive (operation 402). Next, a new size for the population can be determined (operation 404). The remaining members of the population can then be filled in by mutating randomly chosen members in the archive, and updating the archive with the mutated solution (operation 406). Finally, the tournament size can be set to maintain constant selection pressure (operation 408).

It has been observed that maintaining a population size proportional to the archive size helps escape local optima on highly multimodal real-world problems. This mechanism of adapting the population size can be built into the optimization process via the use of the injection rate parameter $\gamma$. The injection rate specifies the ratio of the population size to the archive size, i.e., $$\gamma = \frac{\text{population size}}{\text{archive size}}$$

In some embodiments described herein, the population-to-archive ratio is maintained throughout the optimization process. At any point during the execution of the optimization process, if the population-to-archive ratio differs from the target $\gamma$ by more than a predetermined amount (e.g., 25%), the population size is adapted. This strategy ensures the population size remains commensurate with the Pareto front discovered by the ECBOT. By using the archive size as a proxy for problem difficulty, we assume the population should grow proportionally with problem difficulty.

While adaptive population sizing can aid an ECBOT by maintaining a large set of diverse solutions, an optimization process with dynamically increasing search populations can be prone to genetic drift stall failures due to weakening selection pressure. Therefore, in some embodiments described herein, the selection pressure is kept substantially constant during the optimization process.

The following selection pressure analysis is based on tournament selection, which is the selection mechanism used in some ECBOTs described in this disclosure. The following analysis is for illustration purposes only, and is not intended to limit the present invention to the form disclosed. Accordingly, many modifications and variations will be apparent to practitioners skilled in the art. The probability of selecting the i-th best individual from a population of size using a tournament size q can be expressed as:

$$p_i = \lambda^{-q}((\lambda-i+1)^q - (\lambda-i)^q)$$

Given the population size $\lambda$, we can compute the value of q using the above equation to maintain any desired probability of selection $p_i$ (note that the probability of selection $p_i$ corresponds to the selection pressure). In some embodiments, the selection pressure may remain equal to binary tournament selection with a population size of 100. In other words, in these embodiments, the selection ratio is $\tau = 0.2$. The tournament size q can be computed using the above equation, or it can be approximately computed as $$\text{tournament size} = \max(2, \lfloor \tau\lambda \rfloor).$$

Auto-Adaptive Multi-Operator Recombination

One of the problems encountered when using ECBOTs is the inability to know a priori which recombination operator performs best on a given problem. Some embodiments described herein establish a feedback loop in which operators that produce more successful offspring are rewarded by increasing the number of offspring produced by that operator. Specifically, given K>1 operators, we maintain the probabilities $\{Q_1, Q_2, \ldots, Q_K\}$ of applying each operator to produce the next offspring. In some embodiments described herein, these probabilities can be initialized to $Q_i=1/K$. The operator that is applied in an iteration of the optimization process is selected based on these probability values. Periodically, these probabilities are updated by first counting the number of solutions in the $\epsilon$-box dominance archive that were produced by each operator, $\{C_1, C_2, \ldots, C_K\}$, and updating each $Q_i$ so that operators that tend to produce high quality solutions have a higher probability of being selected. Specifically, in some embodiments, each $Q_i$ can be updated using the following expression:

$$Q_i = \frac{C_i + \varsigma}{\sum_{j=1}^{K}(C_j + \varsigma)}.$$

The constants $\varsigma > 0$ prevents the operator probabilities from reaching 0, thus ensuring no operators are "lost" during the execution of the process. In some embodiments, $\varsigma = 1$. Other expressions for updating the $Q_i$ values will be apparent to practitioners skilled in the art.

In some embodiments described herein, the feedback loop updates the probabilities by counting the number of solutions produced by each operator in the $\epsilon$-box dominance archive. Since the $\epsilon$-box dominance archive maintains the best solutions in terms of both convergence and diversity, selecting operators based on the $Q_i$ values favors operators that produce offspring with these qualities.

Some embodiments described herein can be viewed as a class of evolutionary optimization approaches whose operators are adaptively selected based on the problem and the decision variable encoding. Specifically, some embodiments use the following parent-centric, mean-centric, uniformly distributed and self-adaptive real-valued operators: (1) Simulated Binary Crossover (SBX), (2) Differential Evolution (DE), (3) Parent-Centric Crossover (PCX), (4) Unimodal Normal Distribution Crossover (UNDX), (5) Simplex Crossover (SPX), and (6) Uniform Mutation (UM) applied with probability 1/L. In some embodiments, the offspring produced by SBX, DE, PCX, UNDX and SPX are mutated using Polynomial Mutation (PM).

FIGS. 5A-5F show the offspring distribution generated by different operators in accordance with some embodiments described herein.

Figure 5A:
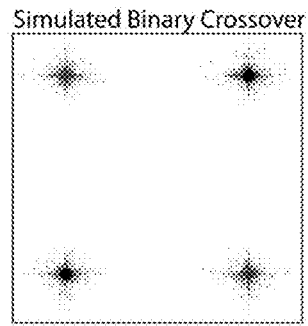
FIGS. 5A-5F show the offspring distribution generated by different operators in accordance with some embodiments described herein.
Figure 5B:
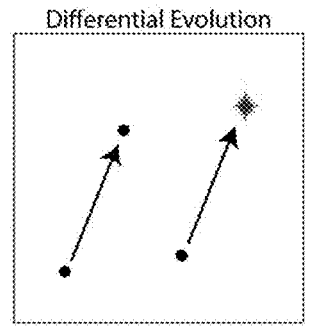
Figure 5C:
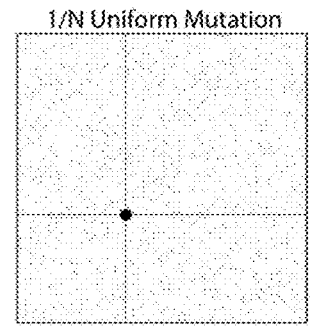
Figure 5D:
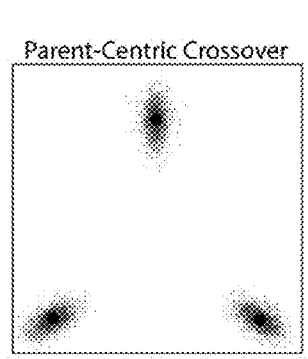
Figure 5E:
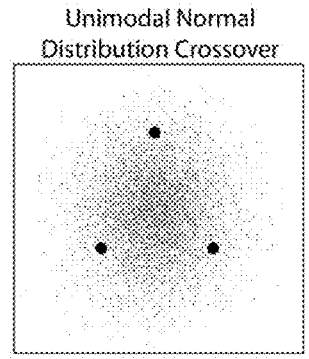
Figure 5F:
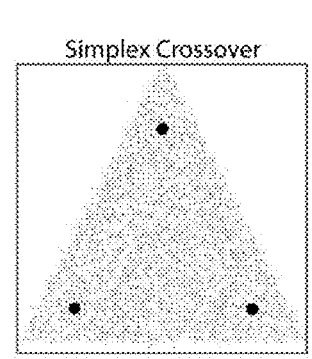

In these figures, parents are indicated by a "●" The arrows shown in FIG. 5B correspond to the difference vectors. As shown in these figures, some operators tend to generate solutions along a single axis, which can degrade their efficacy on problems with high degrees of conditional dependencies among its decision variables. Other operators, on the other hand, do not exhibit this tendency.

Some embodiments described herein select the recombination operator based on the $Q_i$ probability values which correspond to how often the operator produces successful offspring. For example, from the six operators that were described above, it is expected that some embodiments described herein will automatically adapt to use operators that do not tend to generate solutions along a single axis for rotated, epistatic problems which have high degrees of conditional dependencies among its decision variables.

Figure 6:
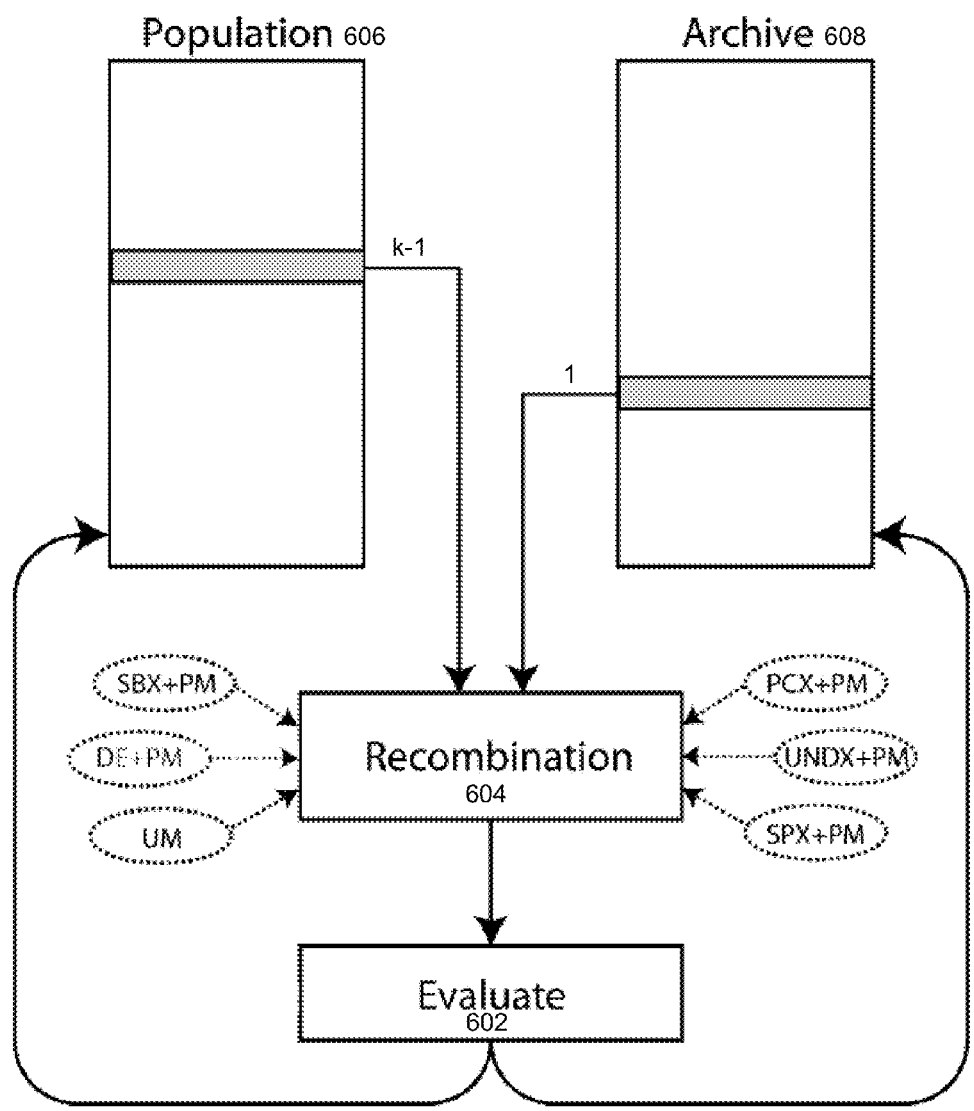
FIG. 6 presents a flowchart that illustrates a process for performing a multi-objective optimization process in accordance with some embodiments described herein.

FIG. 6 presents a flowchart that illustrates a process for performing a multi-objective optimization process in accordance with some embodiments described herein.

In the optimization process, a recombination operator can be selected using the above-described adaptive selection process (block 604). If the recombination operator requires k parents, one parent can be selected uniformly at random from archive 608. Archive 608 can be an $\epsilon$-dominance archive or an $\epsilon$-box dominance archive. The remaining k−1 parents can be selected from population 606 using tournament selection. The resulting offspring can be evaluated (block 602) and considered for inclusion in population 606 and archive 608.

In some embodiments, if the offspring $\epsilon$-dominates or $\epsilon$-box dominates one or more population members, the offspring replaces one of these dominated members randomly. If the offspring is dominated by at least one population member, the offspring is not added to the population. Otherwise, the offspring is non-dominated and replaces a randomly-selected member of the population. Inclusion in the archive can be performed using an archive update process, e.g., the one that was described in reference to FIG. 1.

In each iteration of the iterative optimization process shown in FIG. 6, the optimization process can produce one offspring. After a certain number of iterations have been performed and/or after a certain amount of time has elapsed, $\epsilon$-progress and the population-to-archive ratio can be checked as described in reference to FIG. 3.

If a restart is required, the iterative process shown in FIG. 6 halts and the restart process is invoked as described in reference to FIG. 3. Note that the iterative process shown in FIG. 6 corresponds to main loop 302 in FIG. 3. Once the restart has completed, the iterative process shown in FIG. 6 is resumed and this process repeats until termination.

In some embodiments the process may terminate if: (1) a predetermined number of iterations of the optimization process have been performed, (2) a certain amount of time has elapsed, (3) if $\epsilon$-progress has not occurred after a certain number of iterations have been performed, and/or (4) if $\epsilon$-progress has not occurred after a certain amount of time has elapsed. These termination conditions were presented only for purposes of illustration and description. They are not intended to be exhaustive or to limit the present invention to the forms disclosed. Accordingly, many modifications and variations will be apparent to practitioners skilled in the art.

Once the optimization process terminates, the archive of solution vectors can be provided as an output of the optimization process. Note that the archive of solution vectors can be viewed as an enumeration or approximation of the Pareto front for the optimization problem.

Some embodiments described herein scale linearly with the archive size. If we let selection, recombination and dominance checks take constant time and assume $\gamma$ is a constant, then some embodiments have a runtime complexity of $O(\eta A)$, where $\eta$ is the number of function evaluations and A is the archive size. As explained above, the archive size is controlled by the value of $\epsilon$, which can be chosen by decision makers based on either domain-specific knowledge of their precision goals or computational limits. By scaling $\epsilon$, an ECBOT described herein can be made to run more efficiently at the cost of producing more approximate solutions.

Exploring the limit behavior of an optimization process as the runtime goes to infinity, is important from a theoretical view. It is not necessary for an optimization process to have guaranteed convergence to be practically useful, but issues like pre-convergence and deterioration that arise in some optimization processes make such results informative. In fact, most ECBOTs do not have guaranteed convergence. The main crux of such convergence proofs is the assumption that there exists a nonzero probability of generating Pareto optimal solutions.

According to some studies, two conditions are necessary for convergence. The first necessary condition is that the recombination operators should have diagonal-positive transition matrices. In some embodiments described herein the tournament selection operates with replacement and the recombination operators have a form of mutation in which the entire decision space is reachable. Therefore, in these embodiments, the conditions for diagonal-positive transition matrices are satisfied.

The second necessary condition for guaranteed convergence is elite preservation. It has been shown that the $\epsilon$-dominance archive satisfies elite preservation because an existing solution in the $\epsilon$-dominance archive is replaced by a new solution only if the new solution $\epsilon$-dominates the existing solution. The $\epsilon$-box dominance archive that is used by some embodiments described herein also satisfies elite preservation for similar reasons. In addition to satisfying elite preservation, it has also been shown that the $\epsilon$-box dominance archive preserves the diversity of solutions.

Therefore, the sequence of solutions generated by some embodiments described herein converges completely and in the mean to the set of minimal elements (the Pareto optimal set) as time goes to infinity.

Figure 7:
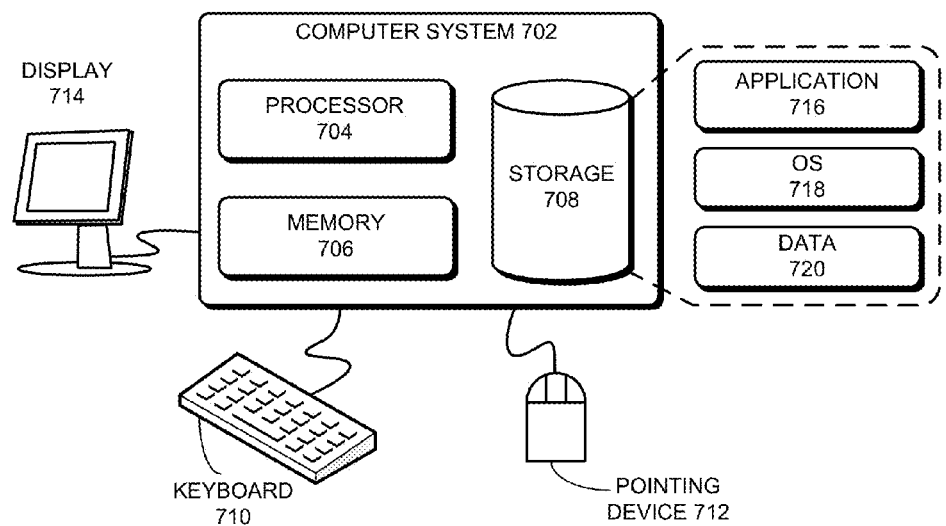
FIG. 7 illustrates a computer system in accordance with some embodiments described herein.

FIG. 7 illustrates a computer system in accordance with some embodiments described herein.

A computer system can generally be any system that can perform computations. Specifically, a computer system can be a microprocessor, a network processor, a portable computing device, a personal organizer, a device controller, a distributed or cloud computing environment, or a computational engine within an appliance, or any other computing system now known or later developed. Computer system 702 comprises processor 704, memory 706, and storage 708. Computer system 702 can be coupled with display 714, keyboard 710, and pointing device 712. Storage 708 can generally be any device that can store data. Specifically, a storage device can be a magnetic, an optical, or a magneto-optical storage device, or it can be based on flash memory and/or battery-backed up memory. Storage 708 can store application 716, operating system 718, and data 720.

Application 716 can include instructions that when executed by computer 702 cause computer 702 to perform one or more processes explicitly or implicitly described in this disclosure.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. The term "non-transitory computer-readable storage medium" as used in this disclosure includes all storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other non-transitory media, now known or later developed, that are capable of storing code and/or data.

Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. The scope of the present invention is defined by the appended claims.

What is claimed is:

1. A method for determining an archive of solution vectors for an optimization problem, the method comprising:
   determining, by computer, a new solution vector for the optimization problem based on a population of solution vectors and the archive of solution vectors;
   in response to determining that the new solution vector dominates one or more solution vectors in the archive of solution vectors, replacing the one or more solution vectors with the new solution vector in the archive of solution vectors; and
   in response to determining that $\epsilon$-progress has not occurred, recreating the population based on the archive of solution vectors, wherein, for a given $\epsilon$ value, new solution vector $u=(u_1, u_2, \ldots, u_M)$ results in $\epsilon$-progress if and only if, for all solution vectors $v=(v_1, v_2, \ldots, v_M)$ in the archive of solution vectors, $$\left\lfloor \frac{v}{\varepsilon} \right\rfloor \neq \left\lfloor \frac{u}{\varepsilon} \right\rfloor \text{ and } \left\lfloor \frac{v}{\varepsilon} \right\rfloor$$

does not Pareto dominate $$\left\lfloor \frac{u}{\varepsilon} \right\rfloor.$$

2. The method of claim 1, further comprising:
   determining a ratio between a size of the population and a size of the archive of solution vectors; and
   in response to determining that a difference between the determined ratio and a target ratio is greater than a predetermined threshold, recreating the population based on the archive of solution vectors.

3. The method of claim 1, wherein recreating the population based on the archive of solution vectors includes:
   adjusting a size of the population so that a ratio between the size of the population and the size of the archive of solution vectors is substantially equal to a target ratio; and
   adjusting a tournament size so that a selection pressure of a tournament selection process that is used for recreating the population is substantially equal to a target selection pressure.

4. The method of claim 1, wherein recreating the population based on the archive of solution vectors includes:
   emptying the population;
   adding solution vectors from the archive of solution vectors to the population;
   randomly selecting a solution vector from the archive of solution vectors, and one or more solution vectors from the population;
   recombining the randomly selected solution vectors to obtain a mutated solution vector; and
   adding the mutated solution vector to the population.

5. The method of claim 1, wherein determining the new solution vector for the optimization problem includes:
   selecting a recombination operator from a set of recombination operators based on a set of probability values, wherein each recombination operator corresponding to a probability value;
   determining the new solution vector using the selected recombination operator; and
   in response to determining that the new solution vector dominates one or more solution vectors in the archive of solution vectors, increasing the probability value associated with the selected recombination operator.

6. The method of claim 5, wherein the set of recombination operators includes one or more of:
   a simulated binary crossover operator;
   a differential evolution operator;
   a parent-centric crossover operator;
   a unimodal normal distribution operator;
   a simplex crossover operator; or
   a uniform mutation operator.

7. The method of claim 1, wherein determining that $\epsilon$-progress has not occurred involves comparing a current value of a $\epsilon$-progress counter with a previously stored value of the $\epsilon$-progress counter.

8. The method of claim 1, wherein determining that $\epsilon$-progress has not occurred involves determining that a $\epsilon$-progress timer has expired.

9. The method of claim 1, wherein the new solution vector dominates an existing solution vector in the archive of solution vectors if and only if the new solution vector $\epsilon$-dominates the existing solution vector.

10. The method of claim 1, wherein the new solution vector dominates an existing solution vector in the archive of solution vectors if and only if the new solution vector $\epsilon$-box dominates the existing solution vector.

11. A non-transitory computer-readable storage medium storing instructions that, when executed by a computer, cause the computer to perform a method for determining an archive of solution vectors for an optimization problem, the method comprising:
   determining a new solution vector for the optimization problem based on a population of solution vectors and the archive of solution vectors;
   in response to determining that the new solution vector dominates one or more solution vectors in the archive of solution vectors, replacing the one or more solution vectors with the new solution vector in the archive of solution vectors; and in response to determining that $\epsilon$-progress has not occurred, recreating the population based on the archive of solution vectors, wherein, for a given $\epsilon$ value, new solution vector $u=(u_1, u_2, \ldots, u_M)$ results in $\epsilon$-progress if and only if, for all solution vectors $v=(v_1, v_2, \ldots, v_M)$ in the archive of solution vectors, $$\left\lfloor \frac{v}{\varepsilon} \right\rfloor \neq \left\lfloor \frac{u}{\varepsilon} \right\rfloor \text{ and } \left\lfloor \frac{v}{\varepsilon} \right\rfloor$$

does not Pareto dominate $$\left\lfloor \frac{u}{\varepsilon} \right\rfloor.$$

12. The non-transitory computer-readable storage medium of claim 11, wherein the method further comprises:
    determining a ratio between a size of the population and a size of the archive of solution vectors; and
    in response to determining that a difference between the determined ratio and a target ratio is greater than a predetermined threshold, recreating the population based on the archive of solution vectors.

13. The non-transitory computer-readable storage medium of claim 11, wherein recreating the population based on the archive of solution vectors includes:
    adjusting a size of the population so that a ratio between the size of the population and the size of the archive of solution vectors is substantially equal to a target ratio; and
    adjusting a tournament size so that a selection pressure of a tournament selection process that is used for recreating the population is substantially equal to a target selection pressure.

14. The non-transitory computer-readable storage medium of claim 11, wherein recreating the population based on the archive of solution vectors includes:
    emptying the population;
    adding solution vectors from the archive of solution vectors to the population;
    randomly selecting a solution vector from the archive of solution vectors, and one or more solution vectors from the population;
    recombining the randomly selected solution vectors to obtain a mutated solution vector; and
    adding the mutated solution vector to the population.

15. The non-transitory computer-readable storage medium of claim 11, wherein determining the new solution vector for the optimization problem includes:
    selecting a recombination operator from a set of recombination operators based on a set of probability values, wherein each recombination operator corresponding to a probability value;
    determining the new solution vector using the selected recombination operator; and
    in response to determining that the new solution vector dominates one or more solution vectors in the archive of solution vectors, increasing the probability value associated with the selected recombination operator.

16. The non-transitory computer-readable storage medium of claim 15, wherein the set of recombination operators includes one or more of:
    a simulated binary crossover operator;
    a differential evolution operator;
    a parent-centric crossover operator;
    a unimodal normal distribution operator;
    a simplex crossover operator; or
    a uniform mutation operator.

17. The non-transitory computer-readable storage medium of claim 11, wherein determining that $\epsilon$-progress has not occurred involves comparing a current value of a $\epsilon$-progress counter with a previously stored value of the $\epsilon$-progress counter.

18. The non-transitory computer-readable storage medium of claim 11, wherein determining that $\epsilon$-progress has not occurred involves determining that a $\epsilon$-progress timer has expired.

19. The non-transitory computer-readable storage medium of claim 11, wherein the new solution vector dominates an existing solution vector in the archive of solution vectors if and only if the new solution vector $\epsilon$-dominates the existing solution vector.

20. The non-transitory computer-readable storage medium of claim 11, wherein the new solution vector dominates an existing solution vector in the archive of solution vectors if and only if the new solution vector $\epsilon$-box dominates the existing solution vector.

21. A system, comprising:
    a processor; and
    a non-transitory storage medium storing instructions that, when executed by the processor, cause the system to perform a method for determining an archive of solution vectors for an optimization problem, the method comprising:
        determining a new solution vector for the optimization problem based on a population of solution vectors and the archive of solution vectors;
        in response to determining that the new solution vector dominates one or more solution vectors in the archive of solution vectors, replacing the one or more solution vectors with the new solution vector in the archive of solution vectors; and
    in response to determining that $\epsilon$-progress has not occurred, recreating the population based on the archive of solution vectors, wherein, for a given $\epsilon$ value, new solution vector $u=(u_1, u_2, \ldots, u_M)$ results in $\epsilon$-progress if and only if, for all solution vectors $v=(v_1, v_2, \ldots, v_M)$ in the archive of solution vectors, $$\left\lfloor \frac{v}{\varepsilon} \right\rfloor \neq \left\lfloor \frac{u}{\varepsilon} \right\rfloor \text{ and } \left\lfloor \frac{v}{\varepsilon} \right\rfloor$$

does not Pareto dominate $$\left\lfloor \frac{u}{\varepsilon} \right\rfloor.$$

* * * * *